May 16, 1961

J. T. NAGLE 2,984,016

CLASSROOM SEATING DEVICE

Filed Sept. 15, 1958

INVENTOR.
John T. Nagle

BY

ATTORNEY.

United States Patent Office 2,984,016
Patented May 16, 1961

2,984,016

CLASSROOM SEATING DEVICE

John T. Nagle, 7708 Fairway, Kansas City 15, Mo.

Filed Sept. 15, 1958, Ser. No. 760,889

6 Claims. (Cl. 35—7)

This invention relates to a classroom seating chart and has for its primary object to provide a seating chart including a pair of relatively movable, proximally disposed panels constructed in a novel manner, permitting the instructor to write pupils' names on one of the panels through perforations in the top panel and according to their seat positions whereby the chart is adapted for indicating quickly at a subsequent time the positions of students in a particular class period even though the individuals in several periods have been written on the same panel.

A further important object of the invention is to provide a secondary chart panel movably positioned behind a primary panel, with the primary panel having a plurality of spaced perforations therein corresponding to rows of seats in the classroom as well as a class period opening therein in spaced relationship to the perforations, and the chart panel having a series of spaced class period identification indicia disposed to be selectively aligned with the class period opening in the primary panel whereby pupils' names may be written on the chart panel through the perforations in the primary panel in accordance with the particular class period and with corresponding period indicia aligned with the defined opening, to the end that such students' names will be realigned with respective perforations in the primary panel each time the chart panel is selectively shifted to a position moving corresponding period indicia into alignment with the opening in the primary panel and thereby indicating the correct seating alignment of the pupils at each class period.

Other important objects of the invention relate to the provision of a relatively inexpensive seating chart formed of stiff paper or the like and suitably perforated and printed to permit the students' names to be written on certain parts of the chart to rapidly and correctly indicate the relative seating position of various students whose names are all written on a common sheet, irrespective of the fact that the pupils are in different class periods; to a classroom seating chart constructed in a manner so that the same is adapted for utilization during both semesters of a school year without it being necessary to use a fresh sheet; to a classroom seating chart as described wherein the perforations in one of the panels through which the names are written are disposed in predetermined spatial relationship with respect to the period indicia on the chart panel therebeneath, to the end that a maximum number of names may be written on a chart panel of minimum area; to a chart where additional identification material may be written on the chart panel and will be selectively brought into realignment with the correct orifices as corresponding period indicia are shifted into alignment with the period opening in the primary panel overlying the chart panel; to a classroom seating chart as referred to above wherein the correct seating position of all students is shown by the chart in lines extending both directions in the room; and to other important objects and details of construction which will become obvious or be explained more fully as the following specification progresses.

In the drawing:

Figure 1 is an elevational view of a classroom seating chart embodying the principles of the present invention, one panel of the chart being broken away to reveal details of the panel therebeneath;

Fig. 2 is a plan view of the chart illustrated in Fig. 1;

Fig. 3 is a vertical, cross-sectional view taken substantially on the line 3—3 of Fig. 1; and Fig. 4 is a fragmentary, elevational view of the chart shown in Fig. 1 with the movable chart panel disposed in its reversed position and certain portions of the device being broken away to reveal details of construction thereof.

Briefly, the instant invention comprises an elongated panel folded along a transverse median line to present a pair of proximal panel segments and receiving a movable chart panel therebetween. One of the panel segments is provided with a plurality of elongated, spaced perforations therein corresponding to rows of seats in a classroom, as well as a class period opening located in spaced relationship to the perforations. The chart panel movably positioned between the panel segments has a plurality of class period identification indicia on at least the face thereof proximal to the perforated panel segment and selectively alignable with the class period opening in the defined panel segment. In this manner, the instructor may write the students' names on the chart panel through the perforations corresponding to the correct seat and with the class period indicated by the corresponding indicia aligned with the class period opening, whereby the seating position of each of the students may subsequently be determined by shifting of the inner chart panel to a position with the correct class period aligned with the class period opening in the outer panel segment.

More specifically, a classroom seating chart broadly designated 10 embodying the concepts of the instant invention and illustrated in the drawing in its preferred form, is constructed of a primary, elongated panel 12 rebent upon itself along a median, transverse line 14 to present a pair of opposed, proximal panel segments 16 and 18 with the outer longitudinal margins 20 and 22 of panel segment 16 extending beyond corresponding margins 24 and 26 of panel segment 18. As best shown in Fig. 2, margins 20 and 22 of panel segment 16 are bent over and secured to margins 24 and 26 of panel segment 18 whereby primary panel 12 when properly folded presents an envelope slidably receiving an inner chart panel 28 disposed between panel segments 16 and 18.

Panel segment 16 is provided with a series of elongated, spaced perforations 30 corresponding to rows of seats in the classroom. Inasmuch as it is desirable that perforations 30 extend substantially the length of rectangular panel segment 16, it has been found to be preferable that each perforation 30 be interrupted by a central section 32 integral with panel segment 16 and dividing each perforation 30 into spaced, elongated, longitudinally aligned apertures 30a and 30b. As indicated in Fig. 1, elongated perforations 30 should be provided for each row of seats in the classroom extending across the room. By the same token, a number of spaced lines 34 are printed on the outer face of panel segment 16 in perpendicular relationship to the longitudinal length of perforations 30 to thereby define rows of seats in the classroom extending rearwardly from the instructor's desk.

An elongated class period opening 36 is also provided in panel segment 16 in spaced relationship to the perforation 30 adjacent the upper margin 38 of panel segment 16 and, as indicated most clearly in Fig. 1, opening 36 is disposed in parallelism with perforations 30. It is also to be preferred that a series of elongated orifices 40, 42 and 44 be provided in panel segment 16 in longitudinal alignment with opening 36 and equally spaced from the proximal perforation 30, the inscriptions "time," "room" and "subject" being placed by orifices 40, 42 and 44 respectively. Also, the designation "class" is placed beside opening 36.

Chart panel 28 shiftably positioned between panel segments 16 and 18 has a series of class period identification indicia 46 printed on both faces 48 and 50 of chart panel 28 and disposed to be selectively alignable with opening 36 in panel segment 16 depending upon whether face 48 or face 50 of chart panel 28 is located in opposed, adjacent relationship to panel segment 16.

Faces 48 and 50 of chart panel 28 are also provided with a number of lines 52 extending in perpendicular relationship to the longitudinal length of indicia 46 and disposed to be aligned with corresponding lines 34 on panel segment 16 to thereby indicate individual seats in the classroom.

In order to distinguish between faces 48 and 50 of chart panel 28, it is to be preferred that face 48 have the identification "Term One" at the upper end 54 thereof projecting above margin 38 of panel segment 16, while face 50 of chart panel 28 has "Term Two" written at the end 54 thereof to permit identification of the same.

In use, the instructor initially aligns "First Period" indicia 46 on face 48 of chart panel 28 with class period opening 36 in panel segment 16 when he desires to make a seating chart of his first period class at the beginning of the first semester of the school year. With the "First Period" indicia aligned with opening 36, the instructor writes the correct time on face 48 of chart panel 28 through orifice 40 and likewise, the room number and subject are written on face 48 through orifices 42 and 44. Next, the instructor writes each student's name on face 48 through respective perforations 30 and at the area of face 48 between lines 52 corresponding to the student's seat in the classroom relative to the other pupils. Although not required, in order to simplify the procedure, it is contemplated that the instructor write the students' names on chart panel 28 beginning with the front row of the classroom and moving progressively rearwardly and in this connection, it is to be preferred that row identification 56 be printed on the outer surface of panel segment 16 adjacent corresponding perforations 30.

At the next class period, the instructor shifts chart panel 28 upwardly with respect to primary panel 12 to move the "Second Period" indicia 46 on face 48 into alignment with class period opening 36. Thereupon, the correct time, room and subject are written on face 48 through orifices 40, 42 and 44 and likewise, the pupils' names are written on face 48 through perforations 30 and at positions corresponding to the students' relative seating disposition.

The above procedure is repeated until the names of students of all class periods have been placed on face 48 of chart panel 28.

It can now be recognized that the instructor may check the seating of his students each day by merely moving the correct period indicia 46 into alignment with opening 36, whereupon the students' names and their seat positions are automatically indicated through perforations 30 in panel segment 16. Correct alignment of the students' names with respective perforations 30, irrespective of the fact that students from all class periods are written on the same sheet, is assured by virtue of the fact that each perforation 30 is only substantially as wide as each identification indicia 46 and also because of the spacing of perforations 30 with the distance therebetween being substantially equal to the width of an area defined by all but one of the indicia 46 on each face 48 and 50 of chart panel 28.

At the beginning of the next semester of the school year, the instructor merely removes chart panel 28 from between panel segments 16 and 18 and reverses panel 28 to place the face 50 thereof in proximal relationship to panel segment 16. The students' names are again written on face 50 with the correct indicia 46 in alignment with opening 36, and automatic indication of the students' seating positions is provided by merely bringing indicia 46 into selective alignment with opening 36.

It can be recognized that the instant seating chart is relatively inexpensive and provides an indication of the seating arrangement of students in various class periods with only one chart being required.

Having thus described the invention what is claimed as new and desired to be secured by Letters Patent is:

1. A classroom seating chart comprising a primary panel provided with a plurality of aligned, spaced perforations therein corresponding to rows of seats in the classroom; and a secondary chart panel movably positioned directly behind said primary panel, the latter having a class period opening therein in spaced relationship to said perforations and said chart panel being provided with a series of spaced class period identification indicium on the face thereof normally adjacent the primary panel, in parallel alignment with said perforations and disposed to be selectively aligned with said opening as the chart panel is shifted with respect to the primary panel whereby pupils' names written on the chart panel through said perforations with each of the indicium selectively aligned with the opening, are brought into realignment with respective perforations each time the chart panel is selectively shifted to a position moving corresponding indicium into alignment with the opening, the distance between each adjacent pair of perforations being at least equal to the width of an area defined by all but one of said indicia.

2. A classroom seating chart as set forth in claim 1 wherein said chart panel is provided with a series of spaced class period identification indicium on each face thereof and selectively alignable with said opening whereby the chart is adapted for use during both semesters of the school year.

3. A classroom seating chart as set forth in claim 1 wherein said perforations, the indicia and the opening are elongated and disposed in longitudinal parallelism, the indicia being in relatively close relationship and the perforations being only slightly wider than the width of each of the indicium to permit a maximum number of names to be written on a chart panel of minimum area.

4. A classroom seating chart as set forth in claim 3 wherein said primary panel has a series of parallel orifices in longitudinal alignment with said opening whereby additional identification material written on the chart panel through said orifices is brought into realignment with respective orifices as said chart panel is selectively shifted to a position moving corresponding indicium into alignment with the opening.

5. A classroom seating chart as set forth in claim 3 wherein the distance between the opening and a proximal perforation is substantially equal to the width of an area defined by all but one of said indicium.

6. A classroom seating chart as set forth in claim 3 wherein said primary panel and the chart panel are provided with a number of spaced lines in perpendicular relationship to the longitudinal length of said perforations and intersecting the same for indicating rows of seats perpendicular to said first mentioned rows.

References Cited in the file of this patent

UNITED STATES PATENTS

| | | |
|---|---|---|
| 472,057 | Kalisch | Apr. 5, 1892 |
| 1,781,047 | Bondeson | Nov. 11, 1930 |
| 1,788,715 | Hall | Jan. 13, 1931 |
| 1,941,777 | Amos | Jan. 2, 1934 |
| 2,493,668 | Gonzalez | Jan. 3, 1950 |